United States Patent [19]

Manore

[11] Patent Number: 5,502,898
[45] Date of Patent: Apr. 2, 1996

[54] FIELD PORTABLE SITE SURVEY SYSTEM

[75] Inventor: Ralph Manore, Toronto, Canada

[73] Assignee: The Carsen Group Inc., Markham, Canada

[21] Appl. No.: 342,040

[22] Filed: Nov. 17, 1994

[51] Int. Cl.$^6$ ..................... G01B 11/00
[52] U.S. Cl. ........... 33/1 V; 33/290; 33/DIG. 21; 356/379; 364/564; 364/567
[58] Field of Search ............. 33/1 H, 1 V, 290, 33/121, DIG. 21; 250/559.21; 356/3, 379, 380; 364/560, 561, 562, 563, 564, 567

[56] References Cited

U.S. PATENT DOCUMENTS

| | | | |
|---|---|---|---|
| 2,688,878 | 9/1954 | Kolisch | 33/1 V |
| 4,767,212 | 8/1988 | Kitahashi et al. | 356/379 |
| 4,806,014 | 2/1989 | Einarson et al. | 356/379 |
| 5,337,149 | 8/1994 | Kozah et al. | 364/560 |

FOREIGN PATENT DOCUMENTS 1-302106  12/1989  Japan ..................... 33/1 V

Primary Examiner—William A. Cuchlinski, Jr.
Assistant Examiner—G. Bradley Bennett
Attorney, Agent, or Firm—Jane Parsons

[57] ABSTRACT

A field portable site survey system includes a portable computer interfaced directly with a rangefinder of the type which needs no reflector, e.g. a rangefinder which receives a signal from a feature of a survey site by backscattering of an incident beam such as a laser beam. A computer program causes the computer to prompt an operator to use the range finder to take measurements appropriate for calculation of the volume of a survey site according to its shape or of its component shapes. The computer calculates the volume in realtime. If the density has been entered into the computer weight will also be calculated.

10 Claims, 3 Drawing Sheets

FIELD PORTABLE SITE SURVEY SYSTEM

BACKGROUND OF THE INVENTION

This invention relates to a portable field unit for providing information concerning the volume and weight of inventory in stock piles.

ACKNOWLEDGEMENT OF PRIOR ART

Surveying the volume and weight of large stock piled bulk materials such as coal, wood chips and sulphur for inventory purposes has been an extremely labour intensive and time consuming process. Industries such as power generation, mining, forestry, shipping and construction have defined needs requiring accurate measurement and control of bulk materials.

Surveys of stock piled bulk materials are typically accomplished using aerial photographic surveys or land survey crews. Both of these measurement techniques have disadvantages.

Land surveys require the presence of a team which must work together over the course of days to measure points on the subject stock piles. Conventional land survey methods require a member of the survey crew to climb to various locations on the stock pile carrying a target. This allows the distance measurement using conventional survey instruments. Depending on the material contained in the stock pile and its configuration, there are a number of potentially dangerous conditions which could arise to endanger the target carrying crew member. When the field process is complete the collected measurements must then be converted to volumes and weights. Considerable work is required to manually calculate these volumes and weights or alternatively to key the measurement data into a computer. The monetary expense, the labour intensive process and potential risks during the survey, may result in the performance of these land surveys on an infrequent basis. Such intervals are not convenient in circumstances where it is desirable to track inventory levels closely.

Aerial surveys are usually photographic in nature. Although the potential dangers and site time are reduced through the use of aerial surveys the translation of photographic data collected into meaningful volume and weight can take a considerable period of time.

The introduction of laser metrology equipment capable of measuring distances of hundreds of meters without the need of reflectors alleviates some of the problems associated with land surveys by minimizing the need for a target carrying team member to climb the subject stock piles. This laser metrology equipment detects back scattered laser light reflected from a non-cooperative (reflectorless) subject such as a feature on a stock pile.

A problem still remains with the presentation of results from such laser metrology equipment. Measurement data collected at the stock pile site must still be processed manually or by computer in an office environment to calculate the volume and weight of the material. The presentation of volumes and weights may be augmented by representation of numerical data in pictorial form. if collection of the original data is incorrect or insufficient the survey crew must revisit the site and repeat the measurement.

The provision of a portable field unit to provide the required information in real time is an ongoing concern. The present inventor has addressed this problem.

SUMMARY OF THE INVENTION

The present invention provides a portable field unit for providing information concerning volume of a survey site comprising an interactive combination of a rangefinder to project a radiation beam such as a laser, for example, a laser beam in the infrared range towards features of the survey site and to receive signals derived from backscattering of said incident radiation beam by features of the site, the rangefinder including program means to extract measurement data from said signals; a personal portable, stand alone, digital computer directly interfaced with said rangefinder to receive said measurement data therefrom, the computer including a program to provide a prompt to an operator to aim the rangefinder to provide selected measurement data to the computer in dependence on a shape of a survey site being surveyed and to calculate the volume of the survey site and including means such as a screen to display in realtime the calculated volume of said survey site.

Input shape selection means may be provided for operator selection of one of a number of shapes corresponding to at least part of said survey site. Input fraction selection means may be provided for operator selection of a fraction of said one of a number of shapes. Input density means may be provided for operator input of density and in which the program includes means to calculate the weight of the survey site.

The field portable unit of the invention is dependent on operator input. The operator may select the information required and obtain the results immediately as a screen display in either numbers or as a graphic display from measurements fed into the computer from the rangefinder. It is possible for the operator to use the rangefinder to take the measurements he believes necessary and to then immediately check the computer to see if this has been sufficient to obtain the information he needs.

The computer may store the measurement values so that they may be presented to the operator in any desired form. For example, the measured values may be stored as a PVM file which may later, with other equipment, be converted to a DXF file for creation of a computer aided drawing.

BRIEF DESCRIPTION OF THE DRAWINGS

An embodiment of the invention will now be described by way of example with reference to the drawings, in which.

DETAILED DESCRIPTION OF A PREFERRED EMBODIMENT

Figure 1:
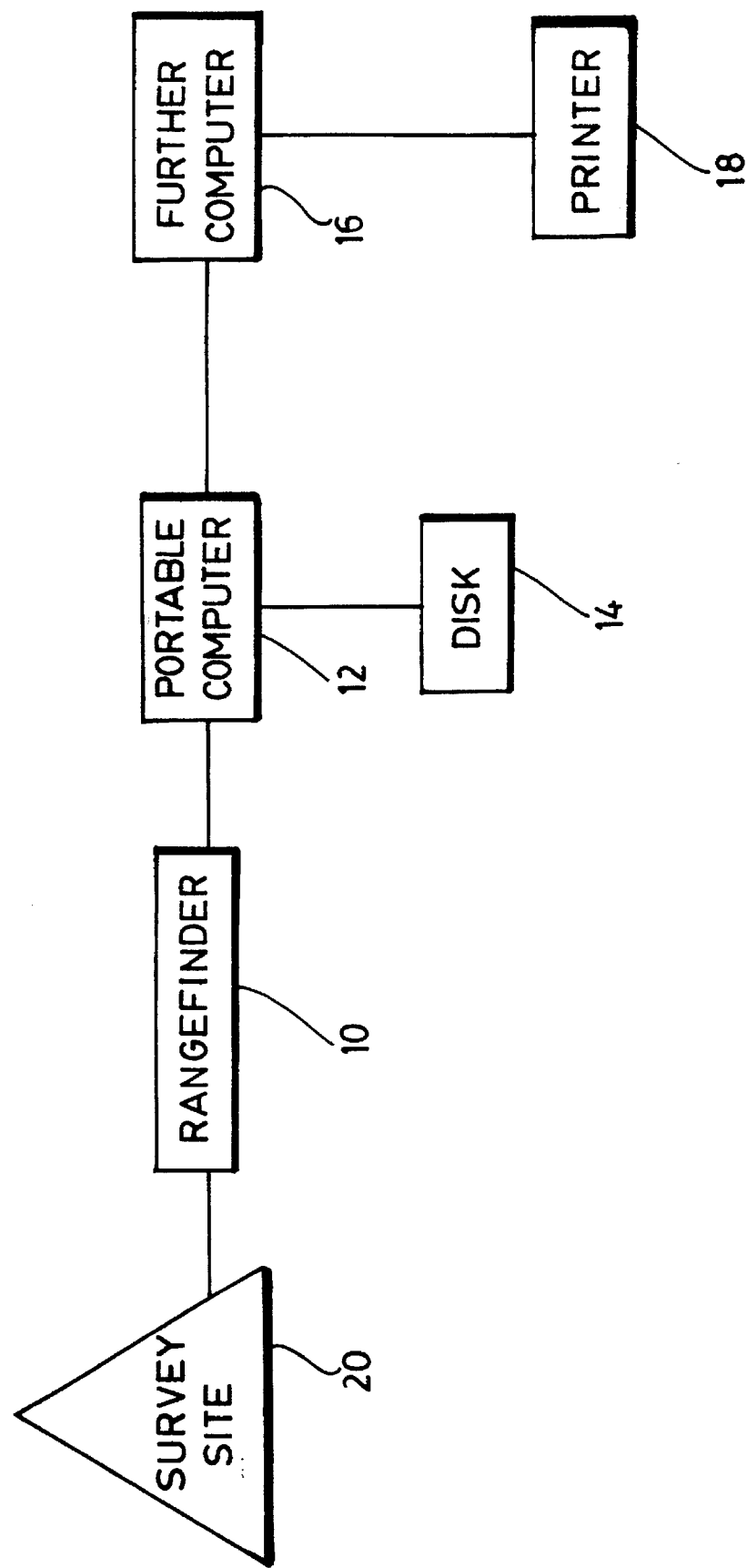
FIG. 1 is a schematic sketch showing the rangefinder interfaced with the computer and utilized to receive information directly from features of the site.

FIG. 1 shows a rangefinder 10 interfaced interactively with a portable computer 12 which may be used by the operator in the field. The portable operator 12 may be utilized to produce a file on a disc 14 or may, itself, be interfaced with a desktop computer 16 and a printer 18. The portable computer 12 may provide an initial immediate visual display of information required by an operator when utilizing the rangefinder to provide information as to the volume and weight of a survey site 20. Conveniently the portable computer 12 may be a pen computer or a laptop computer or other conveniently portable computers.

The rangefinder 10 may be any convenient rangefinder which may be utilized to project a radiation beam towards features of the survey site to receive signals corresponding to said features. The rangefinder 10 may receive signals derived from backscattering of the incident radiation beams by the features of the survey site. Conveniently, the rangefinder may be one utilizing laser radiation in the infrared range. Suitably the rangefinder may be an LEM 300-W laser meter manufactured by Jenoptik GmbH. A rangefinder such as the LEM 300-W laser meter does not require the use of a reflector. Rapid and precise measurements make it possible without the need for a reflector because the measurements are based on backscattering of the incidence signal. The condition of the material of the survey site has little or no bearing on the surveys since the LEM 300-W may be as reliable when surveying rock and ice as when surveying hot surfaces (such as lava), water, top soil or coal.

Operation of the LEM 300-W is based on measurement of the travel time of the laser pulses. The on-board computer converts the recorded pulses into measurement data. All necessary trigonometric calculations are made and the LEM 300-W may be interfaced with portable computer 12 via an RS232 interface. Baud rate and data format are adjustable.

Operation of the interactively interfaced rangefinder 10 and portable computer 12 will now be described with reference to the simplified flow chart of FIG. 2.

Figure 2:
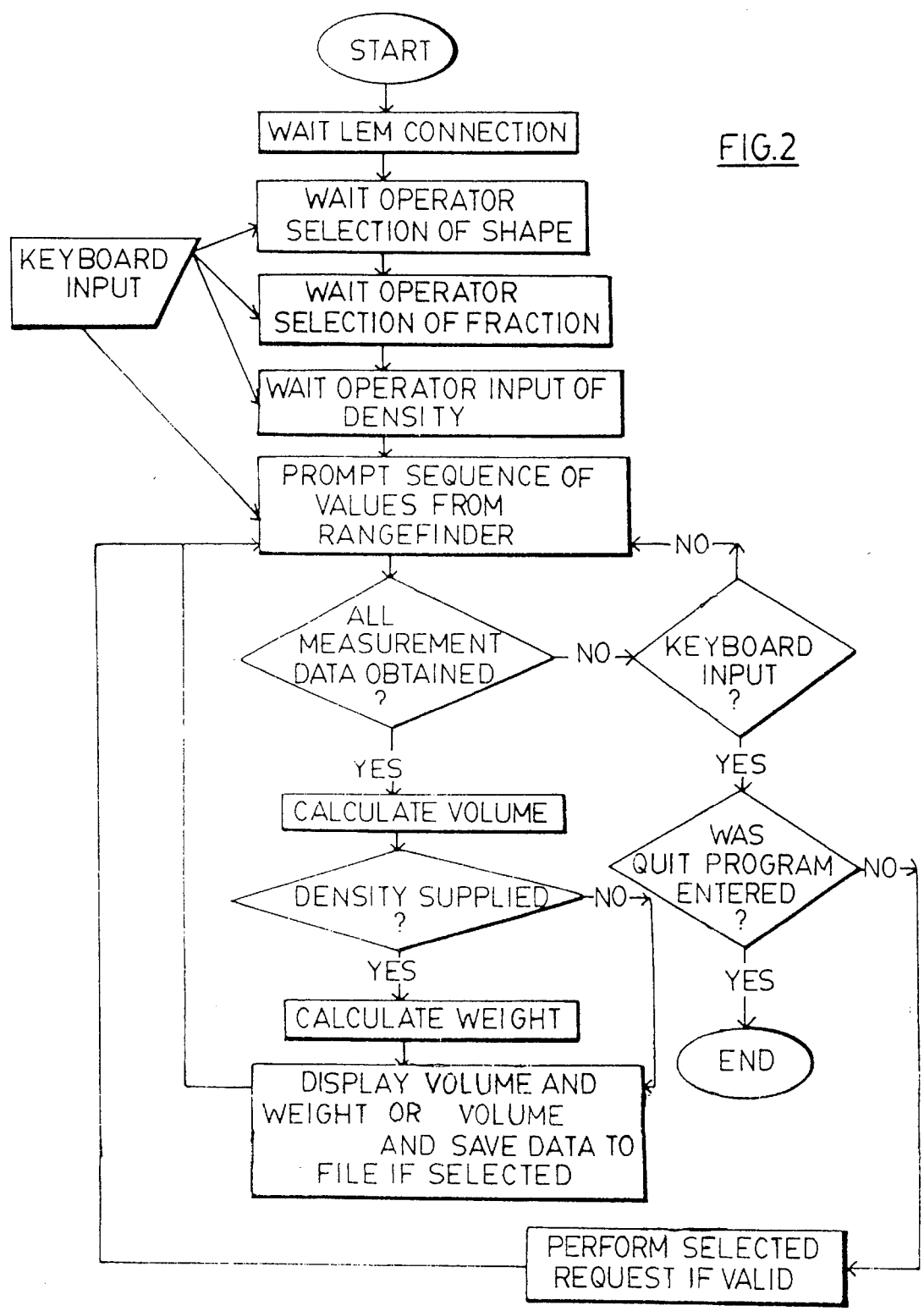
FIG. 2 is a simplified flow diagram of the data processing system of the computer.

The flow chart of FIG. 2 shows the main elements of a volume and weight measurement program which may be utilized in conjunction with any suitable computer operating system, e.g. DOS 3.3 or later versions.

When it is desired to find the volume and/or weight of a survey site the LEM 300-W is interfaced with the computer, the program is installed and the computer is booted up.

First the computer checks the LEM 300-W connection. If a good connection is not made, indication will be given to the operator that this is so. If a good connection is made the program proceeds to the next step.

The operator is required by a prompt to enter the type of measurement that he wishes to perform. Thus, the operator may select a particular shape of survey site from a choice of such shapes or may merely indicate that the shape of the survey site is irregular.

Once the general shape of the survey site has been entered into the computer, the operator is further required by a prompt to provide .information as to the portion of the survey site for which information is required. Thus, it may be that information is only required concerning one half, one quarter or other fraction of the site.

Once this information has been entered, the operator is required by a prompt to provide the parameters necessary for calculation of the required information.

If the required information concerns the weight of the survey site, then the operator will be required to enter the density of the site. If the density is not known only the volume can be calculated. If the weight is not required it is not necessary to enter the density. In this case only the volume will be calculated.

At this stage the computer is now ready to accept data directly from the LEM 300-W in dependence upon the shape of the survey site which has been entered by the operator and in dependence upon the fraction of the survey site which it is required to measure.

First, fixed values such as the height at which the LEM 300-W is stationed is required. This may be a fixed height for various different operations and thus it may be a stored value which may be recalled without measurement for each operation. Other fixed. values may be stored in a similar way.

According to an algorithm for calculation of the shape of the survey site entered by the operator, the operator will now be required to carry out a series of operation utilizing the LEM 300-W. Each operation will require the operator to aim the LEM 300-W at a set point of the survey site and press the measurement button to obtain the measurement. When the series of operations is complete the necessary calculation is performed and is displayed on the computer screen in real-time.

An exemplary calculation of the volume and/or weight of a survey site for a simple survey site shape will be given below. An example is also given for a survey site of irregular shape.

Measurement of Volume and Weight of a ½ Cone Shaped Survey Site

Figure 3:
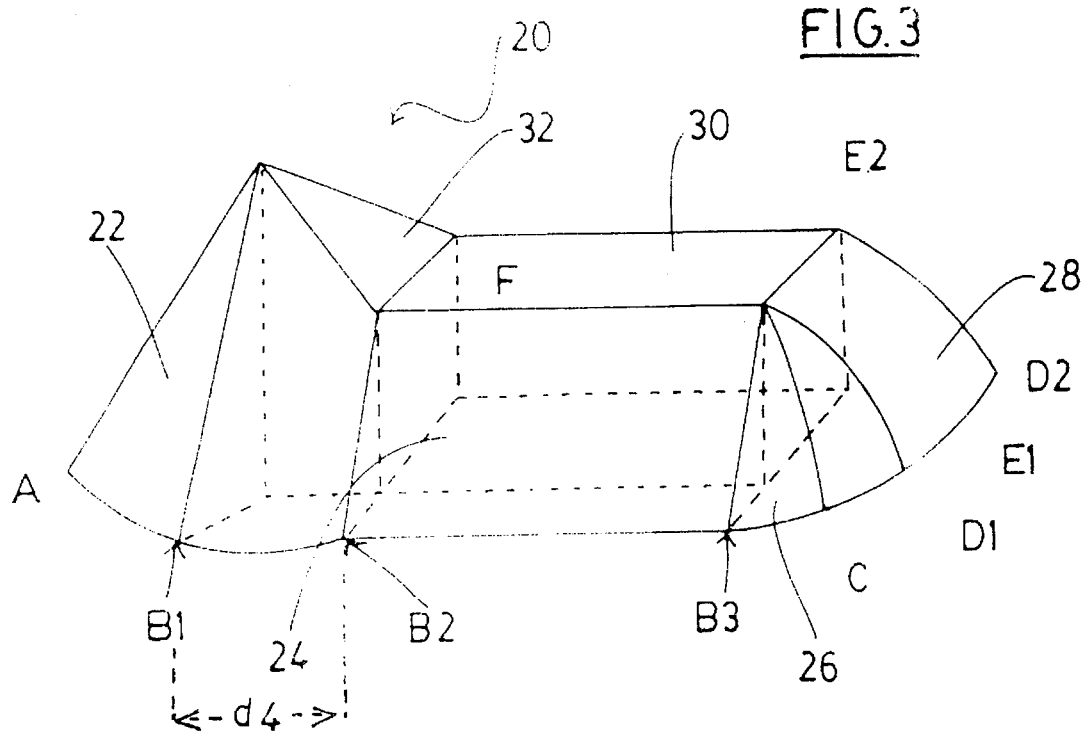
FIG. 3 is a sketch of an irregular survey site.

A half cone 22 may frequently be found at the end of an irregular pile 20 such as that shown in FIG. 3.

The procedure for obtaining a read out for a ½ cone may be as follows:

When the computer has confirmed the LEM connections are in place, the operator is prompted to enter a measurement shape. The cone should be specified in whatever format required by the computer. For example, the program may be menu driven, giving the operator the choice of initial letters or symbols for the possible choices of shape.

After a cone has been specified, the operator qualifies it as being a half portion. Density is now entered if weight of the site is required. The density may be, for example, 5077.50.

The program will now accept readings from the LEM which should be positioned at least a meter or more from the base of the cone.

Figure 4:
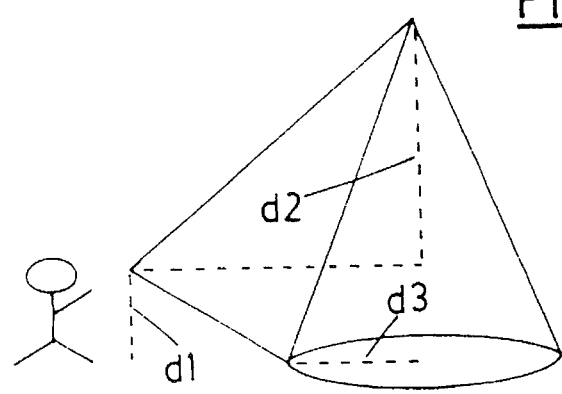
FIG. 4 is a sketch showing measurements made on a cone shaped survey site.

Measurement 1 determines the height of the LEM by either entering its known distance or setting the selector switch on the LEM to position 1 and aiming the LEM at the ground to take a direct distance measurement. This distance is represented by d1 in FIG. 4. The measurement from a tripod is preferable to determining the height using a LEM.

Measurement 2 requires setting the selector switch on the LEM to position 2 and aiming the LEM at the apex of the cone and pressing the measurement button to obtain the station height measurement. The distance returned here is shown as d2 in FIG. 4.

Measurement 3 requires setting the selector switch on the LEM to position 3 (two point distance) and then aiming the LEM at the apex of the cone and pressing the measurement button. The aim of the LEM is moved to the base of the pile and again the measurement button is depressed. The movement of the LEM to measure the base of the pile should not introduce a lateral movement of the LEM. The returned distance from this measurement is shown as d3.

Volume of the half cone is now calculated and displayed on the screen. If density has been included then weight may also be displayed.

Measurement of an Irregular Pile

The measurement of an irregular pile can be performed in several ways. It is most likely that the composite volume of an irregular pile is made up of a number of basic shapes. The measurement of such a pile is then the sum of the volumes of its composite parts. The pile illustrated in FIG. 3 is an example of an irregular pile and the recommended procedure for measuring an irregular pile is based on this Figure. Other irregular shapes will, of course, have their own unique requirements.

FIG. 3 represents a pile that has very regular sides, slopes and peaks. Piles undoubtedly appear much less regular than this representation but appearance has been simplified for calculation purposes. The measurement of this pile may be conducted in the following order:

A) a half cone 22

B) an irregular pile 24

C) a quarter sphere 26

D) an elongated sphere 28

E) a rectangle 30

F) a quarter cone 32

Observation stations for measurement for the above units may be linked to the above list using the alpha character that represents the object being measured. Observation stations are A, B1, B2, B3, C, D1, D2, E1, E2 and F.

The measurement of the ½ cone 22 from position A will use the techniques outlined under the procedures outlined for half cones. Similarly measurements of the ¼ cone 32 only differ from those set out for half cones in selection of the fraction. The measurements of the irregular pile may take place as follows:

Step 1. The LEM is positioned at station B1 at a distance of at least 1 meter or greater from the base of the pile.

Step 2. Measurement 1 determines the height of the LEM. This can be done by either entering its known distance or setting the selector switch on the LEM to position 1 and aiming the LEM at the ground to take a direct distance measurement. This distance is d1. The measurement from a tripod is preferable to determining the height using the LEM.

Step 3. Measurement 2 requires setting the selector switch on the LEM to position 2 and then aiming the LEM at the apex of the ½ cone located at position A and pressing the measurement button to obtain the two point height measurement. The distance returned is d2.

Step 4. Measurement 3 requires setting the selector switch of the LEM and then aiming the LEM at the apex of the ½ cone located at position A and pressing the measurement button. The aim of the LEM is moved to the base of the pile and the measurement button is again depressed. Movement of the LEM to measure the base of the pile should not introduce a lateral movement of the LEM. The returned distance from this measurement is d3.

Step 5. The LEM is moved to station B2 and steps 1 to 4 are repeated.

Step 6. The last measurement in this sequence is to take a direct distance measurement back to station B1 from station B2. The position of B1 should be marked and visible from station B2 before measurement is taken. The selector switch on the LEM is set to position 1 and then measure the direct distance to the spot marked on the ground at the previous observation station B1. This will return measurement d4.

Step 7. The volume of the pile located between station B1 and B2 can now be calculated by the program and the results displayed to the screen.

Steps 5 and 6 are repeated with the LEM at station B3 and the volume for the pile between B2 and B3 will be calculated.

The actual algorithms used in each calculation are as follows. The volume of a cone is calculated using the following values:

| Variable | Description |
|---|---|
| size! | size variable that contains .25, .5 or 1 |
| r! | radius |
| h1! | LEM height |
| h2! | station height |
| v# | volume |

The volume (v#) is then calculated as:

$$v\# = size! * ((\pi * r!^2 I(h2! + h2!))/3)$$

An irregular pile volume is calculated as the sum of a finite series of half rectangles.

The first three measurements, LEM height, station height and two point distance define the area of a triangle. The LEM height plus the station height are used to calculate the total height. These values are stored and the process is repeated from a second observation station further down the pile. At the completion of the second set of measurements, the operator is required to measure the change in observation station distances. This measurement is a direct distance measurement back to the previous location. This returns the hypotenuse of a right angled triangle. The horizontal distance is then corrected by using the Pythagorean theorem.

For example, if the LEM height is 1.7 m and the direct distance measurement taken from position 2 back to position 1 was 18.5, the true horizontal distance is then calculated as follows:

$$x1 = \sqrt{(18.5^2) - (1.7^2)}$$

The value returned for the horizontal distance is 18.42 meters. This value is then used in the calculations.

The values used to calculate the volume of an irregular pile are as follows:

| Variable | Description |
|---|---|
| h0! | Total height from the previous measurement station 1 |
| r0! | Radius (or distance from vertical height to base of pile) from previous measurement station 1 |
| h1! | Height of LEM |
| h2! | Station Height |
| x1! | horizontal distance between observation stations 1 and 2 |
| x% | integer derived by multiplying x1!*10 used to set limit to For Next Loop used to calculate multiple volume slices across distance x1! |
| v# | volume accumulator for this slice of irregular pile |
| rn! | Adjusted radius for current triangular area |
| hn! | Adjusted total height for current triangular area |
| a1! | Area of triangular area at position 1 |
| a2! | Area of triangular area at adjusted position along axis x towards position 2 |
| av! | Average of a1! + a2! |

To calculate the volume of an irregular pile assigned values to heights and radius at the two measurement stations are used. If the height at station 1 is 14.75 m (13.05+ 1.7), the height at station 2 is 13.20 m (11.50+1.7), the radius at station 1 is 4.95 and the radius at station 2 is 5.45 m, the calculation would be performed as follows:

The distance between observation stations is multiplied by 10 and the value is rounded to the nearest integer. The result is 184. This result is used to determine the extent of a For Next Loop that parses the 18.42 block into 184 sections that are each 10 cm long. Each of these blocks total height and radius are adjusted to reflect where they are within the volume being calculated.

The difference between both observation station heights and radius are divided by 184. This result give the value to adjust the height and radius of each progressive block for which we are calculating a volume. In this case the values returned are 0.0084239 m for height and –0.0027173 m for the radius.

The first volume is then calculated using the average of the changed radius and the height measurements times a correction from 10th's of meters to meters (0.10) times 0.5 to accomplish the halving of the rectangular volume.

The calculation for the first volume is then as follows:

r0! = 4.95
rn! = r0! + (ABS(r0! – r!) * (1/INT(x1! * 10)))
rn! = 4.95 + (ABS(4.95 – 5.45) * (1/INT(18.42 * 10)))
rn! = 4.95 + (ABS(–0.5) * (1/184))
rn! = 4.95 + .0027173
rn! = 4.9527173 h0! = 14.75
hn! = h0! + (ABS(h0! – (h1! + h2!)) * (1/INT(x1! * 10)))
hn! = 14.75 – (ABS(14.75 – 13.2) * (1/184))
hn! = 14.75 – 0084239
hn! = 14.741577 a1! = (r0! * h0!)/2
a1! = (4.95 * 14.75)/2
a1! = 36.50625 a2! = (rn! * hn!)/2
a2! = (4.9527173 * 14.741577)/2
a2! = 36.505431 av! = (a1! + a2!)/2 av! = (36.50625 + 36.505431)/2
av! = 36.50584 v# = av! * .1
v# = 36.50584 * .1
v# = 3.65058

This series of calculations can also be represented using the following form:

$V_1 = .5 * (((14.75 - .0084239) + 14.75)/2) * ((4.95 - (-.002717)) + (4.95)/2)) * .1$
$V_1 = .5 * (14.745788 * 4.9513585) * .1$
$V_1 = 3.65058 \text{ m}^3$ The next calculation adjusts the height and radius used as a base to the adjusted value used in the above equation to calculate the next volume. This results in the following calculation:

$V_2 = .5 * (((14.745788 - .0084239) + 14.745788/2) * ((4.9513585 - (-.002717)) + (4.9513585)/2)) * .1$
$V_2 = .5 * (14.741576 * 4.952717) * .1$
$V_2 = 3.65054 \text{ m}^3$ $V_1 + V_2 = 7.30634 \text{ m}^3$ then gives the cumulative volume for the first two sections of the object. Each successive change in the radius and height as the finite series of calculations progresses brings the value closer to those measured at observation point 2. This can be proven by multiplying the change value by 184 and adding or subtracting the result from the original value. For example:

13.20=14.75–184*(0.0084239)

The accuracy with which the volume is calculated is directly dependent on the distance between these finite changes being represented by a straight line. If the changes over the observation station distance are not easily represented by straight lines, it is suggested that the change in observation distance should be lessened to increase accuracy.

A program suitable for use in a computer and conforming with the flow diagram of FIG. 2 is also reproduced hereunder by way of example.

A field test of the apparatus was carried out by way of example on a survey site for which land survey and aerial survey results were already known for a test of accuracy of the equipment.

The aerial survey results had involved overflying the site and taking photographs during such overflying. From data concerning the distances of the aircraft from the site at the movement of which the photographs were taken and measurements on the photographs themselves the results of the aerial survey were calculated. The land survey result had required the presence of a team measuring points on the pile. In the test of the equipment of the present invention both the observations and the calculations were completed in approximately one hour. The procedure was as follows:

The test was conducted at QIT (Quebec Iron Titanium) in Sorel, Quebec on two stock piles which, as stated above, had been independently surveyed. The first pile (pile 1) was an irregular shape that contained several conical shapes and a flat horizontal rectangular surface. The second pile (pile 2) was much less irregular in shape and had a semi-spheroid shape. The results are as follows:

| Survey Team | Pile 1 | Variance | Pile 2 | Variance |
|---|---|---|---|---|
| Aerial | 134,694 | 0% | 246,959 | 0% |
| Land Survey | 135,710 | .75% | N/A | N/A |
| Field Portable Unit Team | 135,495 | .59% | 249,784 | 1.14% |

It may be seen that the results for the test of the field portable unit of the invention for pile 1 lie between those provided by the aerial and land surveys. It would, therefore, appear that the accuracy of the equipment is at least as great as that of previously used methods while the time taken in achieving the result is dramatically improved.

While the invention has been described with reference to an immediate screen display of the results of calculation of the volume and/or density of the survey sights, it is noted that the data received from the LEM may be moved to another computer and converted to a DXF file and utilized in conjunction with a CAD program to provide a computer aided drawing. Moreover, the computer display to the operator may be as a graphical representation of the survey site which may be printed on any printer capable of printing graphics. Still further, the file may be saved to disk for further manipulation at leisure with more sophisticated equipment. The field portable stand alone digital computer 12 may be interfaced directly with more sophisticated equipment for further manipulation or with a printer if desired.

I claim:

1. A field portable unit for providing information concerning volume of a survey site comprising an interactive combination of a rangefinder to project a radiation beam towards features of the survey site and to receive signals derived from backscattering of said incident radiation beam by features of the site, the rangefinder including program means to extract measurement data from said signals;

a personal portable, stand alone, digital computer directly interfaced with said rangefinder to receive said measurement data therefrom, the computer including a program to provide a prompt to an operator to aim the rangefinder to provide selected measurement data to the computer in dependence on a shape of a survey site being surveyed and calculate the volume of the survey site, and including means to display, in realtime, the calculated volume of said survey site.

2. A field portable unit as claimed in claim 1 in which the display means is a display screen.

3. A field portable unit as claimed in claim 1 in which the rangefinder projects a laser beam of radiation.

4. A field portable unit as claimed in claim 3 in which the laser beam is in the infrared range.

5. A field portable unit as claimed in claim 1 in which the personal portable, stand alone, digital computer is a pen computer.

6. A field portable unit as claimed in claim 1 in which the personal portable, stand alone, digital computer has input shape selection means for operator selection of one of a number of shapes corresponding at least part of said survey site.

7. A field portable unit as claimed in claim 6 in which the personal portable, stand alone, digital computer has input fraction selection means for operator selection of a fraction of said one of a number of shapes.

8. A field portable unit as claimed in claim 1 including the personal portable, stand alone, digital computer has input density means for operator input of density and in which the program includes means to calculate the weight of the survey site.

9. A field portable unit as claimed in claim 8 in which, for a survey site of large irregular shape, the computer includes means to aggregate the volumes of operator selected component shapes.

10. A field portable unit as claimed in claim 1 in which means are provided to save a file of the values input into the digital computer and calculation performed thereby for reproduction or further manipulation.

* * * * *